(12) United States Patent
Warner

(10) Patent No.: US 6,934,283 B1
(45) Date of Patent: Aug. 23, 2005

(54) SYSTEM AND METHOD FOR SOURCE DEFINED PACKET ROUTING

(75) Inventor: Craig W Warner, Addison, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/436,062

(22) Filed: Nov. 8, 1999

(51) Int. Cl.$^7$ .............................................. H04L 12/50

(52) U.S. Cl. ...................................... 370/380; 370/400

(58) Field of Search ............................... 370/216, 217, 370/218, 221, 351, 389, 392, 400, 380, 386, 370/387, 388; 710/305, 316, 317; 712/10, 712/11, 16

(56) References Cited

U.S. PATENT DOCUMENTS

| | | | | |
|---|---|---|---|---|
| 5,577,204 | A | * | 11/1996 | Brewer et al. ............... 710/317 |
| 5,721,819 | A | * | 2/1998 | Galles et al. ............... 709/243 |
| 6,160,811 | A | * | 12/2000 | Partridge et al. ........... 370/401 |
| 6,230,252 | B1 | * | 5/2001 | Passint et al. ................ 712/12 |

OTHER PUBLICATIONS

Hu et al. A Queueing Model for Wormhole routing with Timeout. IEEE. Jul. 1995. pp. 584-593.*

Stallings, William. "Data and Computer Communications". Prentice-Hall. Copyright 1997. pp. 541-546.*
Mike Galles, "Scalable Pipelined Interconnect for Distributed Endpoint Routing: The SGI SPIDER chip," Proceedings of Hot Interconnect 1996, pp. 141-146.

* cited by examiner

*Primary Examiner*—Chi Pham
*Assistant Examiner*—Derrick W. Ferris

(57) ABSTRACT

A data communication system and method are provided to communicate in a multiprocessor interconnection network or other network. In one embodiment, the present system includes a number of logical circuits that are located in a number of nodes interconnected in a multiprocessor interconnection network. In this regard, the nodes include at least one source node, at least one destination node, and at least one intermediate node. The logical circuits include source logic located in the source nodes to identify data routes between respective source nodes and destination nodes through the one or more intermediate nodes. The data routes are specified by at least one destination port value and a current hop count that are attached to a data packet to be transmitted between respective source and destination nodes. The logical circuits also include routing logic in the intermediate nodes to route the data packets along the data routes, and destination logic in the destination node to detect a final destination of the data packet. The various embodiments of the present invention also include return routing logic in the intermediate nodes to record a return route in the data packet.

27 Claims, 7 Drawing Sheets

| Routing Table RT0 | | | | | | |
|---|---|---|---|---|---|---|
| Destination | Via | Dest Port 1 | Dest Port 2 | ... | Dest Port N | Total Hops |
| MC7 | $X_0$ | 5 | 0 | ... | | 2 |
| MC7 | $X_0$ | 4 | 0 | ... | | 2 |
| MC7 | $X_1$ | 7 | 0 | ... | | 2 |
| MC7 | $X_1$ | 6 | 0 | ... | | 2 |
| ... | ... | ... | ... | ... | ... | ... |

123  126  129  133

SYSTEM AND METHOD FOR SOURCE DEFINED PACKET ROUTING

TECHNICAL FIELD

The present invention is generally related to the field of data communications and, more particularly, is related to a system and method for defining a data route for forward and return routing of a packet in a network.

BACKGROUND OF THE INVENTION

Since the advent of the integrated microprocessor circuit, computing technology has become more and more complex. In the not too distant past, processor circuits included a single processor with an accompanying memory that were electrically coupled to a data bus and control bus. Software applications running on such machines were relatively simple as compared to today's complex applications. In particular, the clock speeds at which such processor circuits operated were relatively slow, thereby limiting the size of the various applications that could be implemented thereon.

However, improvements in integrated circuit technology have resulted in an increase of processor speeds. At the same time, the size and complexity of the software applications that are implemented using the faster processors has also increased. However, computer chip manufacturers have been faced with new challenges to push the speeds of integrated circuits even higher. Specifically, problems of stray capacitance and other electrical properties of the conductors within integrated circuits make it difficult to route high frequency signals in high speed processor circuits.

One approach to increase the speed of computer systems in spite of the above problems is to employ parallel processing. This is to say that a number of processor circuits may operate simultaneously to process various aspects of a particular software application. Such systems may employ one or more shared memories to operate on data that is common to the various applications. To make such shared memories possible, computer systems may employ various networking components to shuttle data between one or more memory components to the multiple processor circuits, etc. A problem exists, however; when one or more of the networking components fail. Typically, upon the existence of such a failure, computer systems cease operation even though other parallel processing components are still capable of operation.

SUMMARY OF THE INVENTION

In light of the foregoing, the present invention provides for a data communication system and method to communicate in a multiprocessor interconnection network. In one embodiment, the present system includes a number of logical circuits that are located in a number of nodes interconnected in a multiprocessor interconnection network. In this regard, the nodes include at least one source node, at least one destination node, and at least one intermediate node. The logical circuits include source logic located in the source nodes to identify data routes between respective source nodes and destination nodes through the one or more intermediate nodes. The data routes are specified by at least one destination port value and a current hop count that are attached to a data packet to be transmitted between respective source and destination nodes. The logical circuits also include routing logic in the intermediate nodes to route the data packets along the data routes, and destination logic in the destination node to detect a final destination of the data packet. The various embodiments of the present invention also include return routing logic in the intermediate nodes to record a return route in the data packet.

In another embodiment, the present invention may also be viewed as a method for data communications. Broadly stated, the method comprises the steps of: generating a data packet to transmit from a source node to a destination node through at least one intermediate node in a network; identifying a data route from the source node to the destination node through the at least one intermediate node, the data route being specified by a sequence of at least one destination port value and a current hop count that are attached to the data packet to be transmitted from the source node to the destination node; routing the data packet along the data route in the at least one intermediate node; and detecting an arrival of the data packet in the destination node.

The various embodiments of the present invention provide various advantages in that the source nodes control the data route and hence which components of the multiprocessor interconnection network are employed in the transmission of a data packet from a respective source node to a respective destination node, allowing the source node to reliably route the data packet to the destination even in the presence of network component failures.

By recording a return data route in a header of the data packet, the destination node can route an acknowledgement packet, for example, back to the source node on the same data route taken by the data packet. This advantageously allows the source node to reliably route the data packet and a corresponding acknowledgment packet even in the presence of network component failure and independent of the state of a routing table in the destination node. As a result, the fact that the routing table in the destination node is not yet initialized will not effect the routing of the acknowledgment packet.

In addition, the various embodiments of the present invention provides an approach to steering data packets through the network with low latency. Routing table lookups are not required at intermediate nodes as the destination port value for each intermediate node is located in the header of the data packet to be routed.

The various embodiments of the present invention further provide an ability to transmit a data packet to either intermediate nodes or to destination nodes, depending upon the functionality contained within these respective nodes.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
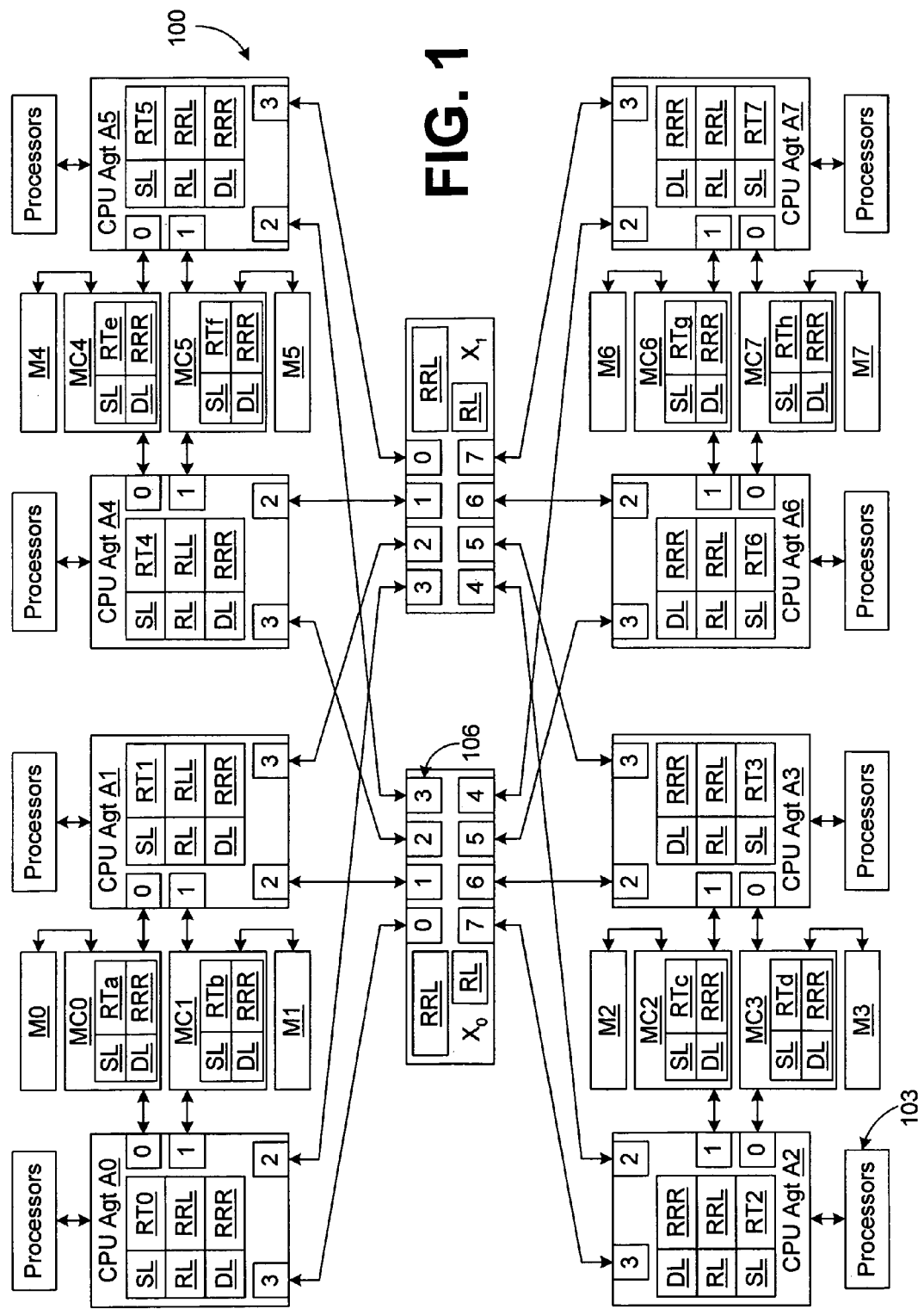
FIG. 1 is a schematic diagram of a multiprocessor interconnection network according to an embodiment of the present invention.

Turning to FIG. 1, shown is a multiprocessor interconnection network 100 (hereinafter, "network 100") according to an embodiment of the present invention. The network 100 includes a number of processors 103 that operate in parallel. The processors 103 may comprise, for example, central processing units or microprocessors that interpret and execute instructions, etc. The processors 103 are electrically coupled to a number of central processor unit (CPU) agents A0–A7 as shown. There are up to four processors 103 linked to each CPU agent A0–A7, although it may be possible that more than four processors are linked to the individual CPU agents A0–A7. Each CPU agent A0–A7 is linked to two memory controllers MC0–MC7. For example, both CPU agents A0 and A1 are linked to memory controllers MC0 and MC1. Similarly, CPU agents A2 and A3 are both linked to memory controllers MC2 and MC3, CPU agents A4 and A5 are linked to memory controllers MC4 and MC5, and, CPU agents A6 and A7 are linked to memory controllers MC6 and MC7 as shown. The network 100 also includes a number of memories M0–M7 that are linked to respective memory controllers MC0–MC7.

The network 100 also includes a first crossbar $X_0$ and a second crossbar $X_1$. Both the CPU agents A0–A7 and the first and second crossbars $X_0$ and $X_1$ include a number of data ports 106 as shown. The data ports 106 are numbered in each CPU agent A0–A7 and crossbar $X_0$ and $X_1$. The CPU agents A0–A7 and the crossbars $X_0$ and $X_1$ are linked to each other through the various data ports 106 using various parallel buses, etc. In addition, each CPU agent A0–A7 is linked to the respective memory controllers MC0–MC7 through respective data ports in a similar manner. The interconnections between the processor 103, the CPU agents A0–A7, the memory controllers MC0–MC7, and the memories M0–M7 allow each processor 103 to obtain data from any one of the memories M0–M7 while executing a particular software application. The data stored in the memories M0–M7 and accessed by the processors 103 is organized into cache lines. Each cache line may comprises, for example, 16–128 bytes of data, where there is any number of cache lines in each memory M0–M7 as known in the art. It is understood that the cache lines may comprise more or less bytes of data than the above range, depending upon the particular design of the network 100, etc.

Each of the CPU agents A0–A7 includes source logic SL, routing logic RL, destination logic DL, return routing logic RRL, return route reconstitution logic RRR (hereafter "the reconstitution logic RRR"), and a respective routing table RT0–7. These components are employed to facilitate the transfer of data packets in the network 100. The memory controllers MC0–MC7 also include the source logic SL, destination logic DL, reconstitution logic RRR, and a respective routing table RTa–h. Finally, the crossbars $X_0$ and $X_1$ include the routing logic RL and the return routing logic RRL. The functionality of the source logic SL, destination logic DL, routing logic RL, return routing logic RRL, reconstitution logic RRR, and the routing tables RT0–7/ RTa–h will be described in greater detail in the text that follows.

To describe the operation of the network 100, an example of a cache line request is described. The following assumes that one of the processors 103 needs to obtain a particular cache line stored in one of the memories M0–M7. First, one of the processors 103 sends a request for a particular cache line stored in one of the memories M0–M7 to the corresponding CPU agent A0–A7 that interfaces with the respective processor 103. The respective CPU agent A0–A7 then employs the source logic SL to generate a cache line request in the form of a data packet that is to be transmitted to a respective one of the memory controllers MC0–MC7 that interfaces with the particular memory M0–M7 that stores the desired cache line. The respective CPU agent A0–A7 includes a routing table RT0–7 that it consults to determine an appropriate data route through the network 100 to the respective memory controller MC0–MC7. The particular data route is specified by a number of parameters in the routing table RT0–7 that are included in the header of the data packet according to the source logic SL.

The data packet is then transmitted to the respective memory controller MC0–MC7 through one of the crossbars $X_0$ or $X_1$ and another one of the CPU agents A1–A7. Thus, the crossbars $X_0$ and $X_1$ perform the functionality of routing a particular data packet from a first CPU agent A0–A7 to a second CPU agent A0–A7 pursuant to routing logic RL resident in each of the crossbars $X_0$ or $X_1$. In addition, besides generating data packets for transmission, the CPU agents A0–A7 also act as crossbars, each CPU agent A0–A7 including routing logic RL to route the data packets between the crossbars $X_0$ and $X_1$ and to the memory controllers MC0–MC7. Thus, the CPU agents A0–A7 act in dual capacity to service their respective processors 103 and to act as a crossbar when appropriate.

Note that the crossbars $X_1$ and $X_0$, and the CPU agents A0–A7 also include return routing logic RRL that serves to record a return route in the data packet as it navigates along the data route to its respective destination.

Once the respective memory controller MC0–MC7 has received the request for the cache line from the respective CPU agent A0–A7, the respective memory controller MC0–MC7 employs the destination logic DL to determine that it is in fact the final destination of the data packet. The respective memory controller MC0–MC7 then responds by generating an acknowledgement packet that is transmitted back along a return route to the transmitting CPU agent A0–A7 to inform the transmitting CPU agent A0–A7 that the data packet containing the request for the particular cache line has reached its final destination.

Note however, the data packets relaying other information can originate in the memory controllers MC0–MC7 as well as the CPU agents A0–A7. In particular, the memory controllers MC0–MC7 include routing tables RTa–h that are consulted by the memory controllers MC0–MC7 to determine a particular data route for a data packet that is to be transmitted across the network 100. Thus, the network 100 facilitates communication between any two CPU agents A0–A7, between any two memory controllers MC0–MC7, and between CPU agents A0–A7 and memory controllers MC0–MC7, etc. Also, communications may be established between the crossbars X0 and X1 and any one of the CPU agents A0–A7 or memory controllers MC0-MC if the crossbars X0 and X1 include the source logic SL, destination logic DL, and the reconstitution logic RRR, as will become apparent.

Figures 2, 3:
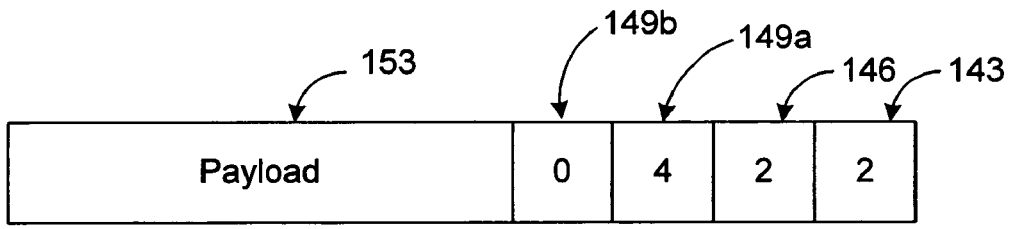
FIG. 2 is a table diagram of a data route table employed in various components of the multiprocessor interconnection network of FIG. 1.
FIG. 3 is a block diagram of a data packet employed in the multiprocessor interconnection network of FIG. 1.

Turning then to FIG. 2, shown is the routing table RT0 that resides in the CPU agent A0 as an example of all of the routing tables RT0–7/RTa–h. The routing table RT0 includes a destination column 123, a crossbar column 126, a number of destination port columns 129 and a total hops value column 133. For each data route entry in the routing table RT0, the destination column 123 indicates the particular component in the network 100 (FIG. 1) to which a data packet is to be transmitted from the CPU agent A0. There may be more than one data route between any two components in the network 100, although it may be preferable to use some paths over others. In particular, the shortest data routes are generally preferable to reduce a path latency of the network 100. Consequently, the most preferred path to a particular component may be listed first among similar paths in the routing tables RT0–7/RTa–h.

The crossbar column 126 indicates the particular crossbar $X_0$ or $X_1$ employed in a data route to get to the final destination component. The destination port columns 129 indicate a particular destination port through which a respective data packet leaves a particular crossbar $X_0$ or $X_1$, or a specific CPU agent A0–A7 along the data route. Finally, the total hops value column 133 indicates a total number of hops that a particular data packet undertakes from component to component across the network 100 to reach its final destination. A specific hop comprises the movement of a particular data packet from one component to another component in the network 100.

With reference to FIG. 3, shown is an example of a data packet 136 that may be employed to transmit data from one component to the next in the network 100. The data packet 136 includes a total hops value 143, a current hop count 146, a first destination port value 149a and a second destination port value 149b. The data packet 136 also includes a data payload 153. The data payload 153 generally contains the substantive data of the data packet 136. The total hops value 143, current hop count 146, first destination port 149a, and second port 149b are employed by the network 100 to route the data packet 136 from a source component in the network 100 to a destination component. Note that there may be more or less destination port values 149 in a particular data packet than those shown, depending upon the nature of the network 100, where the two destination port values 149a and 149b are shown as examples.

Figure 4:
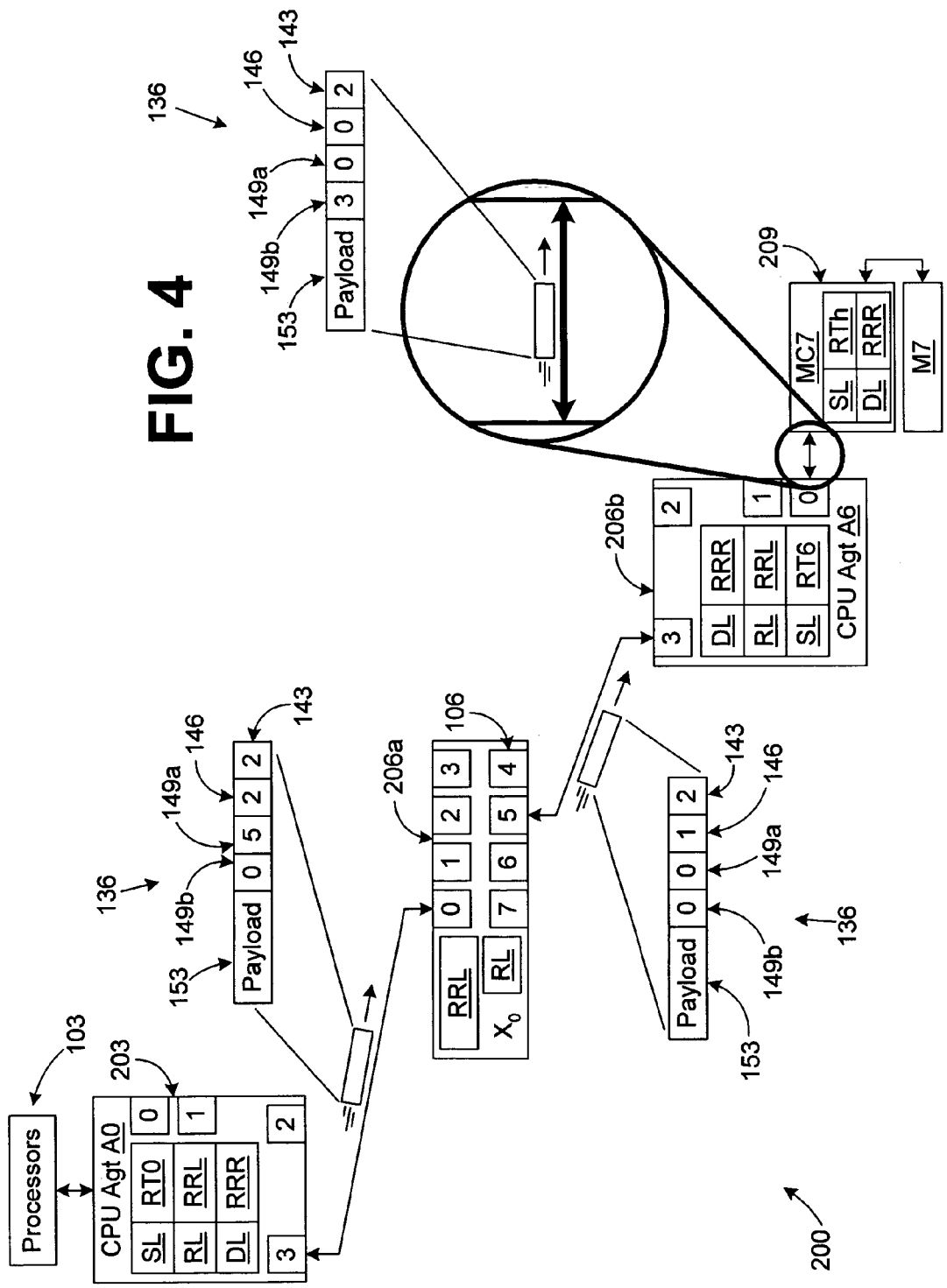
FIG. 4 is a schematic diagram of a data route employed in the multiprocessor interconnection network of FIG. 1.

Turning then, to FIG. 4, shown is a specific example of a data route 200 according to an embodiment of the present invention. The data route 200 extends from the CPU agent A0 to the memory controller MC7 as shown. To facilitate the following discussion, the network 100 (FIG. 1) may be considered a network of nodes that facilitate the communication of the data packets 136 (FIG. 3). In the context of the data route 200, the CPU agent A0 functions as a source node 203, the crossbar $X_0$ and the CPU agent A6 function as intermediate nodes 206, and the memory controller MC7 functions as a destination node 209.

Generally, for purposes of the present invention, a source node 203 may be comprised of any one of the CPU agents A0–A7 (FIG. 1) or the memory controllers MC0–MC7 (FIG. 1). Additionally, an intermediate node 206 may comprise any one of the CPU agents A0–A7 or, any one of the crossbars $X_0$ and $X_1$. Finally, a destination node 209 may comprise any one of the CPU agents A0–A7, or any one of the memory controllers MC0–MC7. For a given data route, the status of a CPU agent A0–A7, crossbar $X_0$ or $X_1$, or memory controller MC0–MC7 as either a source node 203, intermediate node 206, or destination node 209 depends upon where the particular data route 200 begins and ends accordingly.

Note however, that ultimately any of the memory controllers MC0–MC7, CPU agents A0–A7, crossbars $X_0$ and $X_1$ may act as either a source, destination, or intermediate node 203, 206, or 209 depending on the logical functionality included therein.

The following discussion will trace a particular data packet 136 as it travels from the source node 203 to the destination node 209 through the intermediate nodes 206 as shown in FIG. 4 to further describe the present invention. At the source node, the data packet 136 is generated to be transmitted to the destination node 209. For example, assuming that the source node 203 was the CPU agent A0, a processor 103 linked thereto may request a cache line stored in the memory M7 that is linked with the destination node 209 (memory controller MC7). In this context, the CPU agent A0 acts as a source node 203 and generates a data packet 136 that is transmitted to the destination node 209 to retrieve the desired cache line from the memory M7.

To begin, the source node 203 generates a cache line request that makes up the substantive data of the data packet 136. Thereafter, the source logic SL in the source node 203 examines the routing table RT0 (that resides in the CPU agent A0) to identify the appropriate parameters of the data route 200 along which the data packet 136 may be transmitted to get to the destination node 209. The data route 200 thus comprises a first hop from the source node 203 to the intermediate node 206a, a second hop from the intermediate node 206a to the intermediate node 206b and a final hop from the intermediate node 206b to the destination node 209.

Once the parameters of the data route 200 are identified in the routing table RT0, the source logic SL includes the parameters in the data packet 136 to be transmitted to the destination node 209. In particular, the total hops value 143, the current hop count 146, and the first and second destination port values 149a/149b are added in a predetermined location in the data packet 136. Note that the location of these parameters in the data packet 136 (FIG. 2) may be in a header or other predetermined location so that they can be identified by the routing logic RL, the return routing logic RRL, the reconstitution logic RRR, and the destination logic DL.

Thereafter, the data packet 136 is transmitted from the source node 203 to the first intermediate node 206a. When the packet 136 is received by the first intermediate node 206a, the routing logic RL of the first intermediate node 206a examines the data packet 136 to determine the value held by the current hop count 146. The routing logic RL then indexes through the destination port values 149a/149b, drawing an association between the value of current hop count 146 and a corresponding destination port value 149a/149b. In essence, the current hop count 146 points to the particular destination port value 149a/149b that is associated with the current intermediate node 206a/206b in which the data packet 136 was received to determine the appropriate destination port through which to send the data packet 136 to accomplish the next hop.

As shown in FIG. 4, the current hop count 146 of the data packet 136 received by the first intermediate node 206a is equal to "2". Thus, at the beginning of the data route 200, the current hop count 146 is equal to the total number of hops "2" located in the total hops field 143. The routing logic RL indexes back through the various destination port values 149a/149b based upon the current hop count 146. In the example of FIG. 4, the current hop count 146 points to the first destination port value 149a that is equal to "5."

Thus, according to the example of FIG. 4, the current hop count 146 of "2" points to the destination port value 149a of "5", although the current hop count 146 may index through the destination port values 149a/149b according to another order. For example, the positions of the destination port values 146 may be switched in the data packet 136 and the current hop count 146, etc. Note that the indexing function of the routing logic RL may be accomplished by applying the current hop count 146 to a selection input of a multiplexer that generates one of the destination port values 149a/149b at the multiplexer output, where the destination port values 149a/149b are routed to one of the particular multiplexer inputs, etc. The destination port value of "5" then causes the routing logic RL to transmit the data packet 136 out of the fifth destination port 106 of the crossbar $X_0$.

In addition to transmitting the data packet 136 out of the fifth destination port 106 of the crossbar $X_0$, the routing logic RL also decrements the current hop count 146 by a value of one, thereby indicating that the data packet 136 has undergone a first hop. This change to the current hop count 146 of the data packet 136 is seen in the data packet 136 as it leaves the first intermediate node 206a.

The data packet 136 is received by the second intermediate node 206b from the first intermediate node 206a as shown. The destination logic DL in the second intermediate node 206a examines the current hop count 146, and, since it does not equal "0", the destination logic DL ignores the data packet 136. The routing logic RL in the second intermediate node 206b examines the current hop count 146 to determine the proper destination port 149a/149b through which the data packet 136 is to be transmitted by the second intermediate node 206b. Since the current hop count 146 is "1," the routing logic RL in the second intermediate node 206b identifies the destination port value 149b of "0" as the proper destination port 106 and transmits the data packet 136 therethrough to the destination node 209 accordingly. The routing logic RL also decrements the current hop count 146 one more time, resulting in a current hop count 146 of "0."

Upon receiving the data packet 136, the destination node 209 employs the destination logic DL to examine the current hop count 146 to determine if it is in fact, the ultimate destination of the data packet 136. Since the current hop count 146 is equal to "0," the destination logic DL in the destination node 209 reacts by informing other functionality in the destination node 209 that it is, in fact, the final destination of the data packet 136. The destination node 209 then accesses the data payload 153 therein to perform the functionality related to the information that the data packet 136 relays. The reconstitution logic RRR is employed in the destination node 209 to generate an acknowledgement packet to transmit back to the source node 203 as will be discussed.

The intermediate nodes 206a and 206b also include return routing logic RRL that is employed to generate a return route that follows the data route 200 in the reverse direction. The parameters identifying the return route that are generated by the return routing logic RRL is preferably stored in the data packet 136 as it moves through the intermediate nodes 206a and 206b. Consequently, once the data packet 136 is received by the destination node 209, the return route is already included therein for the destination node 209 to employ in generating an acknowledgment packet or other packet that is to be sent back to the source node 203, etc.

To generate the return route, the return routing logic RRL in each respective intermediate node 206a/206b essentially identifies the respective source port 206a/206b through which the data packet 136 has been received. The number designation of the source port is then recorded in the data packet 136 by simply writing the source port over the destination port value 149a/149b associated with the particular intermediate node 206a/206b. Alternatively, the same source port value may be written in either a new location in the header or other portion of the data packet 136.

To explain further, assuming the data packet 136 has entered the first intermediate node 206a, the return routing logic RRL keeps track of the source port 106 through which the data packet 136 was received. Assuming that the current hop count 146 is not equal to "0", the proper destination port 106 in the first intermediate node 206a is determined for the data packet 136 by the routing logic RL. Then, the return route logic RRL writes the source port, which in this case is the $0^{th}$ port, over the destination port value 149a (of "5") in the data packet 136 that was identified as discussed previously. This is because there is no need for the particular data packet 136 to retain the destination port value 149a/149b information of a particular intermediate node 206a/206b once the destination port value 149a/149b has been identified in the intermediate node 206a/206b as the data packet 136 is routed therethrough. Note that the destination port value 149b of "0" is overwritten by "3" in the second intermediate node 206b accordingly.

In addition, writing the source port of a particular intermediate node 206a/206b over an associated destination port value 149a/149b in the data packet 136 is advantageous because no further overhead is added to the data packet 136 to record the return route. This is important to reduce an amount of data traffic in the overall network 100 (FIG. 1), thereby improving a data transfer latency of the network 100. Alternatively, the source ports may be written in locations within the data packet 136 that are separate from the destination port values 149a/149b as shown, however, at the expense of adding additional overhead to the data packets 136. The return routing logic RRL operates in the same manner in all of the intermediate nodes 206a/206b.

Thus, the foregoing discussion illustrates how the source logic SL, routing logic RL, return routing logic RRL, destination logic DL, and the routing tables RT0–7/RTa–h are employed to transfer data packets 136 from any one source node 203 in the network 100 to any destination node 209. At the same time, a return route is identified for an acknowledgment packet or other data packet to follow the data route 200 in the reverse direction from the destination node 209 back to the source node 203.

Figure 5:
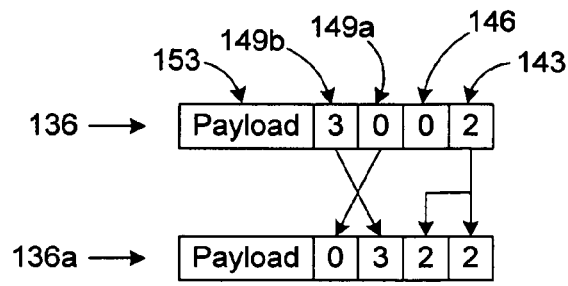
FIG. 5 is a block diagram of the data packet of FIG. 3 as compared to an acknowledgment packet employed in the multiprocessor interconnection network of FIG. 1.

With reference to FIG. 5, shown are the data packet 136 and an acknowledgement packet 136a (hereinafter "ack packet 136a") to illustrate the functionality of the reconstitution logic RRR is employed in the destination node 209. In particular, the reconstitution logic RRR generates the ack packet 136a to be sent to the source node 203 from the data packet 136 by reversing the order of the destination ports 149a/149b and resetting the current hop count 146 as shown.

As a consequence, when the ack packet 136a is sent to the second intermediate node 206a, it makes its way back to the source node 203 in the same manner that the data packet 136 was routed from the source node 203 to the destination node 209.

Figure 6:
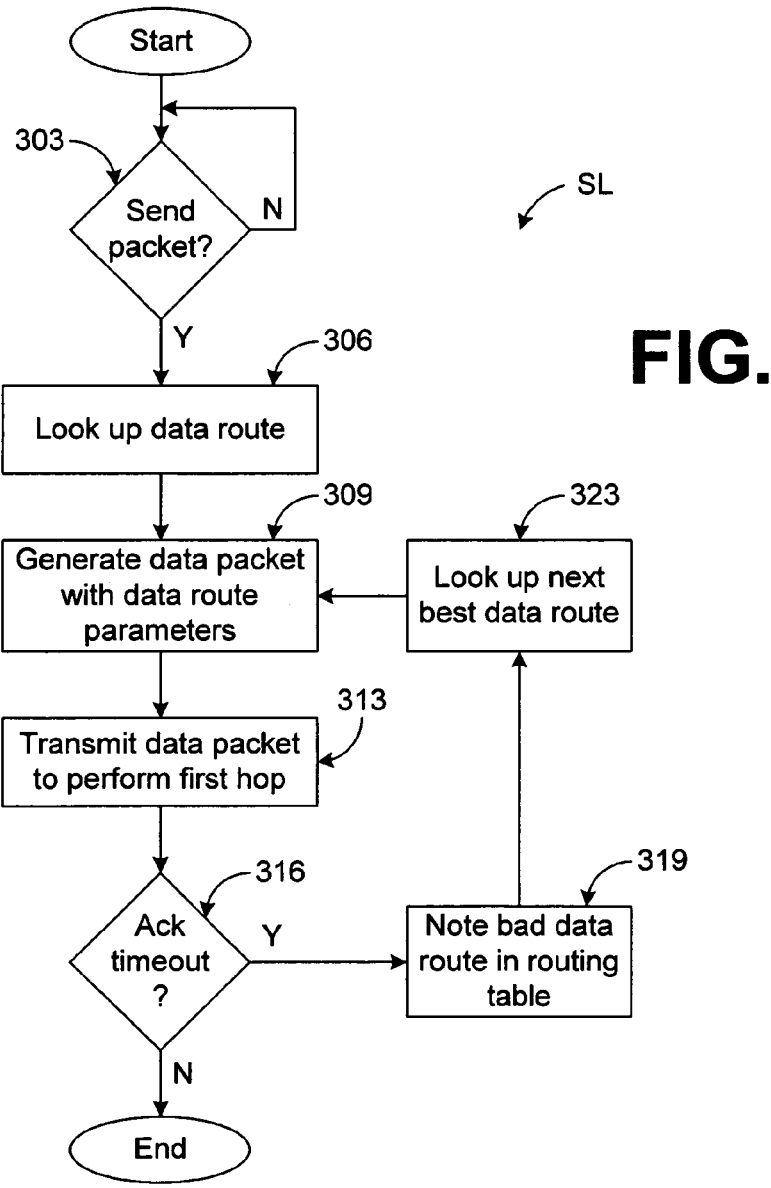
FIG. 6 is a flow diagram of source logic employed in the multiprocessor interconnection network of FIG. 1.

Turning then to FIG. 6, shown is a flow chart of the source logic SL according to an embodiment of the present invention. The source logic SL resides in the CPU agents A0–7 and the memory controllers MC0–7, although other components may employ the source logic SL in other network configurations. The source logic SL is generally employed to generate the data packets 136 (FIG. 2) with the appropriate data route parameters such as, the total hops value 143 (FIG. 2), the current hop count 146 (FIG. 2), and the destination port values 149 (FIG. 2). Beginning with block 303, the source logic SL is triggered to transmit a data packet 136 to a particular destination node 209 (FIG. 4). Then, the source logic SL moves to block 306 in which the appropriate data route 200 is looked up in the routing table RT0–7/RTa–h. The source logic SL moves to block 309 in which the data packet 136 (FIG. 3) is generated with the appropriate data route parameters from the routing table RT0–7/RTa–h in the source node 203. Thereafter, in block 313, the data packet 136 is transmitted to an intermediate node 206a/206b in accordance with a first hop of the data route 200 (FIG. 4) as discussed previously.

Then, in block 316, the source logic SL determines whether an acknowledgment packet timeout has occurred. The acknowledgment packet timeout involves the tolling of a predetermined period of time within which an ack packet 136a (FIG. 5) must be received by the source node 203 from the destination node 209 indicating that the data packet 136 was received successfully by the destination node 209. If the ack packet 136a is received within the timeout period, then the source logic SL ends appropriately. On the other hand, if there is an acknowledgment packet timeout in block 316, the source logic SL moves to block 319 in which the particular data route employed to transmit the data packet 136 is noted as inoperable in the appropriate routing table RT0–7/RTa–h. Thereafter, the source logic SL moves to block 323 in which the next best data route 200 is determined to transmit a duplicate copy of the data packet 136 in a subsequent attempt to reach the destination node 209. Thereafter, the source logic SL reverts back to block 309 to transmit the data packet 136 across the subsequent data route, etc.

Figure 7:
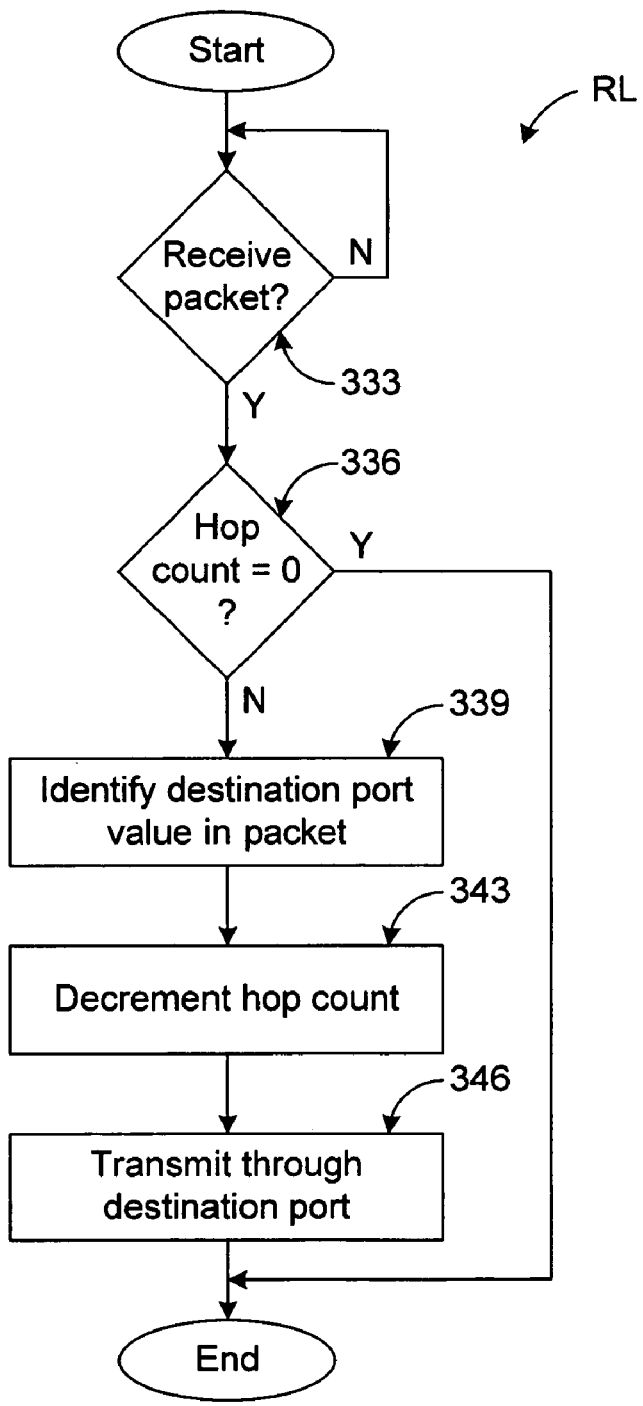
FIG. 7 is a flow diagram of routing logic employed in the multiprocessor interconnection network of FIG. 1.

Turning to FIG. 7, shown is a flow chart of the routing logic RL according to another embodiment of the present invention. The routing logic RL is executed by the intermediate nodes 206a/206b to conduct the data packet 136 along the particular data route 200 as discussed previously. Beginning with block 333, the routing logic RL determines whether a packet 136 (FIG. 3) has been received by the intermediate node 206a/206b. If such is the case, then the routing logic RL moves to block 336 in which the current hop count 146 (FIG. 4) is examined to see if it is equal to "0," thereby indicating that the data packet 136 has arrived at the destination node 209. If such is the case, then the routing logic RL ends as the data packet 136 need not be routed any further. On the other hand, if the current hop count 146 is greater than "0," then the routing logic RL moves to block 339. As an additional note, there is nothing sacred about the actual value of "0" in this case, where the routing logic RL may be designed to react to other values accordingly.

In block 339, the destination port value corresponding to the particular intermediate node 206a/206b is determined by indexing through the destination port values 149a/149b in the data packet 136 based upon the current hop count 146 of the data packet 136. Then, in block 343, the current hop count 146 is decremented by a value of "1." Thereafter, the routing logic RL moves to block 346 in which the data packet 136 is transmitted to the next intermediate node 206a/206b or to the destination node 209 as the case may be. Thereafter, the routing logic RL ends as shown.

Figure 8:
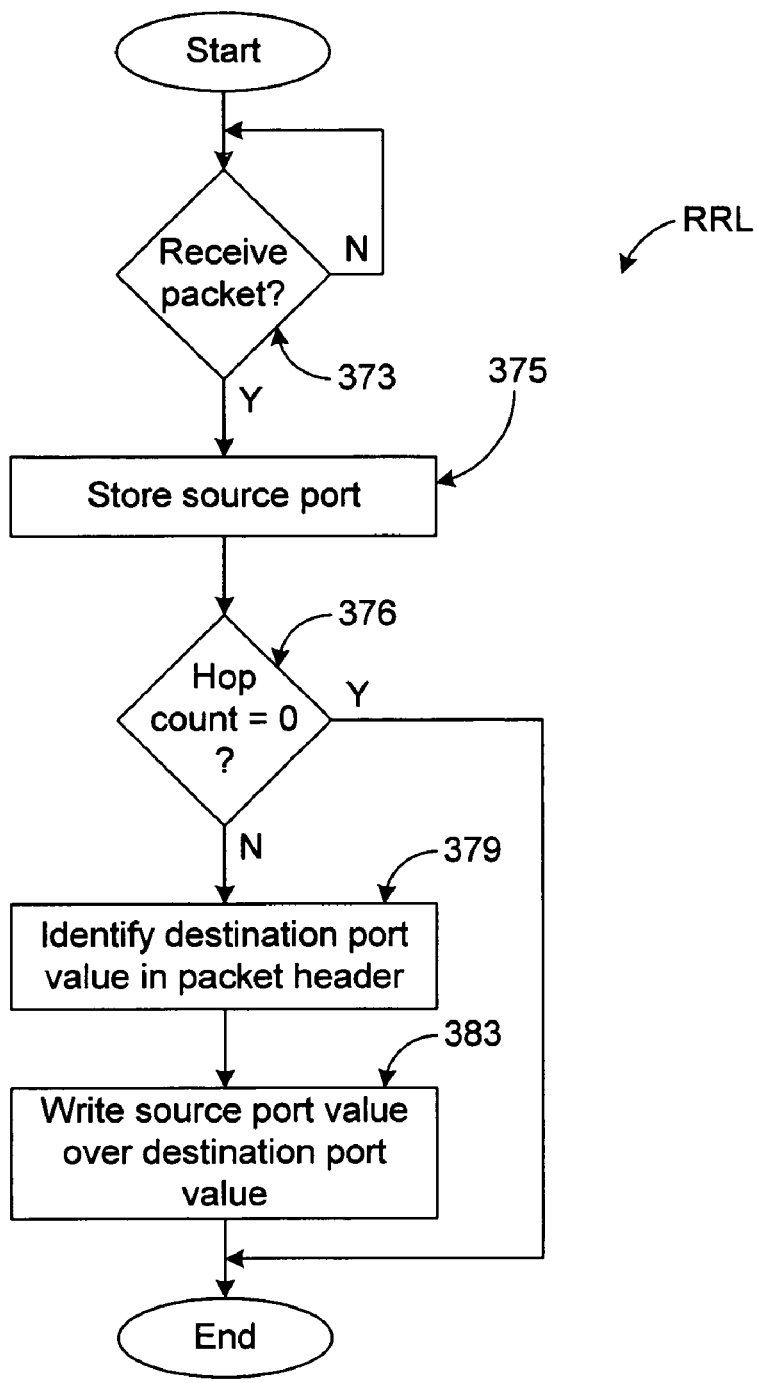
FIG. 8 is a flow diagram of return routing logic employed in the multiprocessor interconnection network of FIG. 1.

Finally, with reference to FIG. 8, shown is a flow chart of the return routing logic RRL according to another embodiment of the present invention. The return routing logic RRL is located in the intermediate nodes 206a/206b to generate the parameters of the return route associated with the original data route 200. The return routing logic RRL begins with block 373 in which it is determined whether the data packet 136 has been received by the respective intermediate node 206a/206b. If such is the case, then the return routing logic RRL moves to block 375 in which the source port through which the data packet 136 was received is temporarily stored. Then, in block 376 the current hop count 146 is examined to determine whether it is equal to "0" or other threshold value in similar manner to the routing logic RL as discussed previously with reference to FIG. 7.

If the current hop count 146 is equal to "0," then the return routing logic RRL ends as shown. Otherwise, the return routing logic RRL proceeds to block 379 in which the destination port value 149a/149b that corresponds with the particular intermediate node 206a/206b is identified. Thereafter, in block 383, the source port through which the data packet 136 was received in the particular intermediate node 206a/206b is written over the destination port value 149a/149b as was discussed with reference to FIG. 4. Thereafter, the return routing logic RRL ends accordingly.

Figure 9:
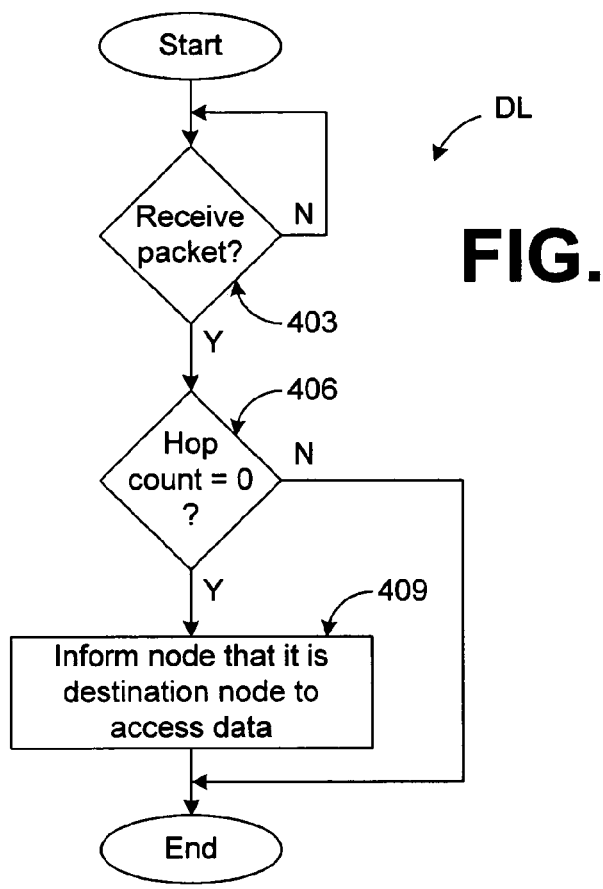
FIG. 9 is a flow diagram of destination logic employed in the multiprocessor interconnection network of FIG. 1.

With reference to FIG. 9, shown is a flow chart of the destination logic DL according to another embodiment of the present invention. The destination logic DL is located in the destination node 209 to determine whether the destination node 209 is, in fact, the final destination of the data packet 136. Beginning at block 403, the destination logic DL determines whether the data packet 136 has been received by the destination node 209. If so, then the destination logic DL progresses to block 406 where the current hop count 146 (FIG. 2) is examined. If the current hop count 146 is equal to "0," then the destination logic DL ends as shown. Otherwise, the destination logic DL proceeds to block 409. In block 409, assuming the current hop count 146 is equal to "0" or other value, the destination logic DL informs further logical circuitry, etc., in the destination node 209 that it is the node for which the data in the data packet 136 was intended. Thereafter, the destination logic DL ends accordingly.

Figure 10:
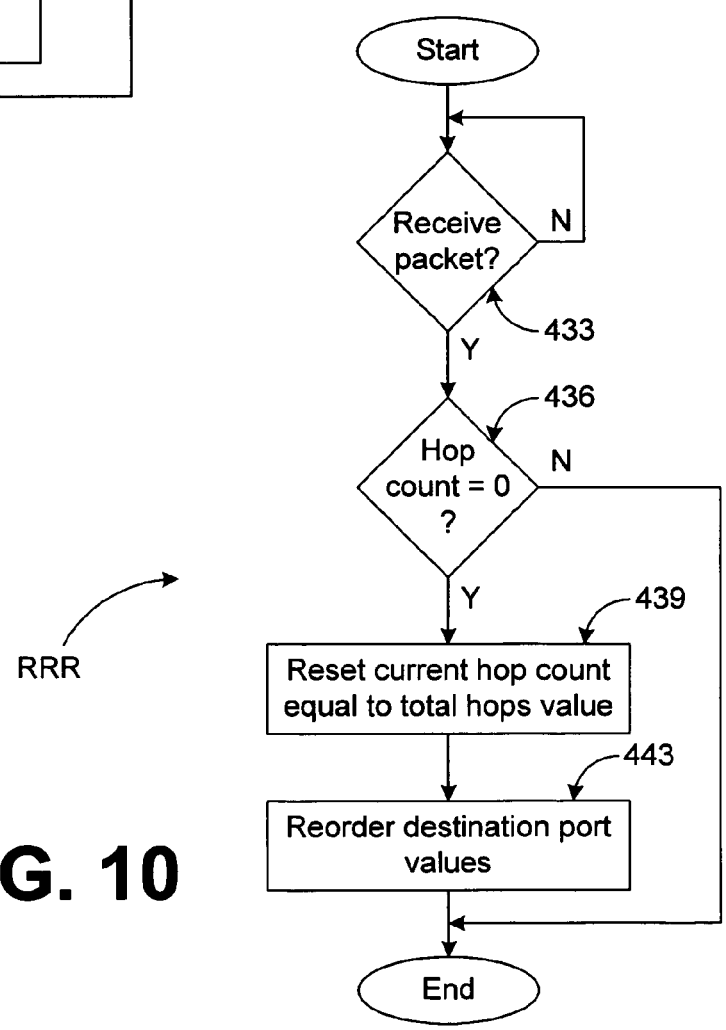
FIG. 10 is a flow diagram of return route reconstitution logic employed in the multiprocessor interconnection network of FIG. 1.

Finally, referring next to FIG. 10, shown is a flow chart of the reconstitution logic RRR according to yet another embodiment of the present invention. The reconstitution logic RRR is located in the destination node 209 (FIG. 4) in order to generate the parameters to transmit an ack packet 136a (FIG. 5) or other data packet back along the return route that was recorded by the intermediate nodes 206a/206b (FIG. 4) while the data packet 136 (FIG. 2) was enroute to the destination node 209. Beginning with block 433, the reconstitution logic RRR determines whether the data packet 136 has been received by the destination node 209. If so, then the reconstitution logic RRR progresses to block 436 where the current hop count 146 (FIG. 2) is examined. If the current hop count 146 is equal to "0," then the reconstitution logic RRR ends as shown. Otherwise, the reconstitution logic RRR proceeds to block 439.

In block 439 the current hop count 146 is reset to equal the total hops value 143 (FIG. 2) and, thereafter, in block 443 the destination port values 149*a*/149*b* are reordered so that the ack packet 136 may properly be routed back to the source node 203 from whence it came. Thereafter, the reconstitution logic RRR ends accordingly.

In addition to the foregoing discussion, the source logic SL, routing logic RL, destination logic DL, return routing logic RRL, and reconstitution logic RRR of the present invention can be implemented in hardware, software, firmware, or a combination thereof. In the preferred embodiment(s), the logic SL, RL, DL, RRL, and RRR are implemented in hardware for maximum speed and to minimize latency. If implemented in software, the logic SL, RL, DL, RRL, and RRR may be stored in a memory and that is executed by a suitable instruction execution system. If implemented in hardware, according to the preferred embodiment, the logic SL, RL, DL, RRL, and RRR can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc. A hardware implementation may be preferable to provide for faster operation an lower latency of the network 100 (FIG. 1).

Also, the flow charts of FIGS. 6–10 show the architecture, functionality, and operation of a possible implementation of the logic SL, RL, DL, RRL, and RRR. In this regard, each block represents a logical circuit, module, segment, or portion of code, which comprises one or more executable instructions for implementing the specified logical function(s). It should also be noted that in some alternative implementations, the functions noted in the blocks may occur out of the order noted in FIGS. 6–10. For example, two blocks shown in succession in FIGS. 6–10 may in fact be executed substantially concurrently or the blocks may sometimes be executed in the reverse order, depending upon the functionality involved.

Finally, the logic SL, RL, DL, RRL, and RRR, may comprise an ordered listing of executable instructions for implementing logical functions that is embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within this disclosure and within the scope of the present invention.

What is claimed is at least the following:

1. A multiprocessor system, comprising:
   a plurality of processors that operate in parallel;
   a plurality of agents each comprising a routing table and agent data ports coupled to respective processors;
   a plurality of memory controllers coupled to each of the plurality of agents via the agent data ports;
   a plurality of memory units coupled to respective memory controllers; and
   at least one crossbar comprising crossbar data ports coupled to a plurality of agents via respective crossbar data ports and agent data ports, wherein the agents and the at least one crossbar comprise routing logic and return routing logic.

2. The system of claim 1, wherein the routing logic decrements a current hop count.

3. The system of claim 1, wherein the routing logic directs the transmission of a packet via a select port responsive to the current hop count.

4. The system of claim 1, wherein the return routing logic records a return route in the data packet as the data packet traverses the route to its respective destination.

5. The system of claim 1, wherein the return routing logic inserts an ingress port indicator into the data packet header, the indicator responsive to the port where the data packet was received.

6. The system of claim 1, wherein the routing table comprises at least one route from the source device to the destination device.

7. The system of claim 1, wherein the agents further comprise source logic.

8. The system of claim 7, wherein the source logic identifies a route communicated via a data packet header comprising an egress data port of a next subsequent device along the route, a current hop count, and a total number of hops in the route.

9. The system of claim 1, wherein the agents further comprise destination logic.

10. The system of claim 9, wherein the destination logic examines a data packet to determine if the packet has reached a designated destination.

11. The system of claim 9, wherein the destination logic swaps an ingress port indicator with an egress port indicator in a data packet header when the current hop count exceeds a threshold value.

12. The system of claim 1, wherein the agents further comprise return route reconstitution logic.

13. The system of claim 12, wherein the return route reconstitution logic identifies a source data port of a received data packet and writes the source port over a destination port.

14. The system of claim 12, wherein the return route reconstitution logic generates an acknowledgement packet.

15. The system of claim 14, wherein the acknowledgement packet reverses the order of destination ports along the route and resets a current hop count.

16. The system of claim 1, wherein the at least one crossbar routes a data packet from a first agent to a second agent pursuant to routing logic.

17. The system of claim 1, wherein the agents route a data packet from a first memory controller to a second memory controller pursuant to routing logic.

18. The system of claim 1, wherein the agents and the memory controllers comprise source logic, destination logic, return route reconstitution logic and a routing table.

19. The system of claim 18, wherein the routing table comprises at least one of a destination identifier, a crossbar identifier, destination ports, and a total hops value.

20. A method for communicating data between devices in a parallel processing system, comprising:
providing a plurality of processors and memory units;
coupling an agent and a memory controller between each of the plurality of processors and memory units;
coupling at least one crossbar between each of the agents;
using source logic within the agents to generate a data packet to transmit data from a source device to a destination device via the at least one crossbar, wherein the source device comprises one of a memory unit and a processor and a destination device comprises one of a processor and a memory unit, respectively;
identifying a particular data route from the source device to the destination device through the at least one crossbar, the data route being communicated via a header associated with the data packet, the header comprising an egress port, a current hop count, and a total number of hops in the data route;
routing the data packet along the data route in response to the egress port; and
detecting the arrival of the data packet at the destination node, wherein identifying a particular data route from the source device to the destination device through the at least one crossbar comprises examining a routing table containing at least one of a destination identifier, a crossbar identifier, destination ports, and a total hops value.

21. The method of claim 20, further comprising:
recording an ingress port indicator responsive to the port where the data packet was received along the data route.

22. The method of claim 20, wherein routing the data packet along the data route comprises decrementing the current hop count.

23. The method of claim 20, wherein routing the data packet along the data route comprises replacing an ingress port indicator with an egress port indicator the header when the current hop count falls below a threshold value.

24. The method of claim 20, further comprising:
acknowledging receipt of the data packet at the destination node by resetting the current hop count to the total hop count and swapping an ingress port indicator with an egress port indicator.

25. The method of claim 24, wherein acknowledging receipt is accomplished independent of the state of a routing table in the destination device.

26. The method of claim 24, wherein acknowledging receipt further comprises checking for a timeout.

27. The method of claim 26, further comprising:
using source logic within an agent to identify a next best data route for transferring data from the source device to the destination device in response to the timeout; and
generating a replacement data packet having an egress port indicator, a current hop count, and a total hop count, the data packet responsive to the next best data route.

* * * * *